United States Patent [19]

Berns et al.

[11] Patent Number: 5,114,767
[45] Date of Patent: May 19, 1992

[54] PROCESS FOR TWIN-SHEET FORMING HIGH HEAT DISTORTION TEMPERATURE THERMOPLASTIC MATERIAL AND ARTICLES THEREFROM

[75] Inventors: Evan M. Berns, Cheshire, Conn.; Angelika H. Clark, Mt. Vernon, Ind.

[73] Assignee: General Electric Company, Pittsfield, Mass.

[21] Appl. No.: 477,784

[22] Filed: Feb. 9, 1990

[51] Int. Cl.⁵ .............................................. B29D 22/00
[52] U.S. Cl. .................................... 428/35.7; 428/195; 428/200; 428/412; 428/473.5; 156/287; 156/311; 156/313; 156/322; 264/166; 264/173; 264/251; 264/545
[58] Field of Search ............... 428/317.7, 319.7, 319.9, 428/198, 35.7, 195, 200, 412, 473.5; 264/545, 166, 173, 251; 156/78, 282, 287, 306.6, 311, 313, 322

[56] References Cited

U.S. PATENT DOCUMENTS

| | | | |
|---|---|---|---|
| 3,462,330 | 8/1969 | Greig et al. | 264/545 |
| 3,971,687 | 7/1976 | Greer et al. | 264/545 |
| 4,428,306 | 1/1984 | Dresen et al. | 108/533 |
| 4,608,104 | 8/1986 | Holtrop et al. | 428/198 |
| 4,695,501 | 9/1987 | Robinson et al. | 428/198 |
| 4,737,414 | 4/1988 | Hirt, Jr. et al. | 428/412 |
| 4,908,251 | 3/1990 | Iimura et al. | 428/198 |

Primary Examiner—Merrell C. Cashion, Jr.
Assistant Examiner—Hoa T. Le
Attorney, Agent, or Firm—Spencer D. Conard

[57] ABSTRACT

A method for twin sheet forming layers high heat distortion temperature thermoplastic materials. The process employs a low heat distortion temperature thermoplastic material layer disposed between the layers of high heat distortion temperature material layer to permit adhesion therebetween at moderate temperatures to reduce thermal degradation. The structures made therefrom are useful as aircraft ducting.

4 Claims, 5 Drawing Sheets

PROCESS FOR TWIN-SHEET FORMING HIGH HEAT DISTORTION TEMPERATURE THERMOPLASTIC MATERIAL AND ARTICLES THEREFROM

BACKGROUND OF THE INVENTION

1. Field of the Invention

The present invention relates to a process for twin sheet forming high heat distortion temperature thermoplastics and structures made therefrom.

2. Description of Related Art

Twin sheet forming processes are known in the art. (See, for example, Dresen, et. al., U.S. Pat. No. 4,428,306) Twin sheet forming processes are useful in producing rigid structures having hollow portions for reduced weight and increased strength. Prior twin sheet forming processes have employed low heat distortion temperature thermoplastics which, while being suitable for the manufacture of many items, are unsuitable for applications such as aircraft ducting which require the use of thermoplastics having good flame resistance, many of which have high heat distortion temperatures. While these known processes for twin sheet forming are suitable for producing articles from low melt temperature thermoplastics, these prior processes are typically not suitable for single layer high heat distortion temperature thermoplastics because the molds used therein if heated to a temperature high enough to achieve bonding between the sheets are too hot to permit the sheets to solidify into the desired shapes. While specialized molds employing high temperature adhesion zones and low temperature forming zones can be employed, such specialized molds add unnecessarily to the equipment costs, and the adhesion zones, usually the clamped mold peripheries, have had to be maintained at temperatures well above the heat distortion temperature of the sheets.

Accordingly, one object of the present invention is to provide a process for producing twin sheet formed structures from high heat distortion thermoplastic materials wherein the mold temperatures are below the heat distortion temperature of the high heat distortion temperature materials. Another object is to provide structures from twin sheet formed thermoplastic materials having high heat distortion temperatures.

SUMMARY OF THE INVENTION

The present invention involves a process for twin sheet forming thermoplastic materials having high heat distortion temperatures. The process employs a laminate having a layer of high heat distortion temperature thermoplastic material and a bonding layer of a low heat distortion temperature thermoplastic material. The mold temperatures required to promote adhesion between the twin sheets can be well below the heat distortion temperature of the high heat distortion temperature thermoplastic material. The molds employed in the present invention do not require specially heated adhesion zones but can have substantially uniform temperatures.

Twin sheet forming processes are set forth in Dresen, et. al., U.S. Pat. No. 4,428,306, which is incorporated herein by reference and which involves a twin sheet thermoforming process wherein each sheet is vacuum formed and the sheets are fused together as described therein by application of pressure between the sheets.

The twin sheet forming process of the present invention involves placing a pair of high heat distortion temperature (HHDT) thermoplastic sheets preheated to a temperature above their heat distortion temperature between two female mold halves having temperatures below the heat distortion temperature of the HHDT material, placing a metal air tube between the sheets, clamping the mold halves together about the periphery of the thermoplastic sheets, injecting high pressure air, preferably at least 50 psi, through the metal air tube and between the sheets, and optionally pulling vacuum on the exteriors of the sheets to force the sheets to spread apart at their centers and conform to the interior configuration of the respective mold halves, and cooling the sheets to a temperature below the heat distortion temperature of the HHDT material. The articles made therefrom are hollow and may be used for any number of purposes including ducting after further manufacturing steps.

More preferably, the twin sheet forming process involves (i) preheating a pair of high heat distortion temperature thermoplastic layers to a temperature above their heat distortion temperature, preferably preheating to a temperature above 450° F., (ii) placing the pair of high heat distortion temperature (HHDT) thermoplastic layers between a pair of female mold halves having temperatures below that of the heat distortion temperature of the HHDT material, the high heat distortion temperature thermoplastic layers having a layer of low heat distortion temperature (LHDT) thermoplastic material located therebetween, (iii) forcing the mold halves together to pinch a substantial portion of the periphery of the layers together, (iv) injecting high pressure gas between the HHDT material layers to force the HHDT layers apart at their centers into conformance with the mold halves, and (v) cooling the layers to a temperature below the heat distortion temperature of the HHDT material.

Suitable high heat distortion temperature (HHDT) materials have a heat distortion temperature at 264 pounds per square inch of at least 300° F. and include thermoplastics such as polyetherimides, polyamideimides, polyimides, polysulfones, polyethersulfone, polyphenylsulfone, polyetheretherketone, polyetherketoneketone, polyaryl sulfone, aromatic polyamides, polyarylsulfones, polyphenyleneether/polystyrene blends and blends of these thermoplastics with other thermoplastics.

The preferred high heat distortion temperature material is polyetherimide.

Also preferred as the high heat distortion temperature material is a blend having 45% by weight polyetherimide, 25% by weight of a copolyestercarbonate, 10% by weight Bisphenol-A polycarbonate, and 20% by weight of a silicone-polyetherimide.

Polyetherimides of the families disclosed in Wirth, et. al., U.S. Pat. No. 3,787,364 and Takekoshi, U.S. Pat. No. 4,024,101, both patents incorporated herein by reference, are useful in this invention. Polymers of the formula below are particularly useful:

The preferred high polymer comprises repeating units of the structure wherein R is a divalent aromatic radical containing from 6-20 carbon atoms, R' is a divalent radical which is the organic residue of a diamine reacted with a nitro-substituted aromatic anhydride and n is an integer having a value from about 10, for instance, from 2 to at least 5,000. More specifically, R can be a member selected from the group consisting of phenylene, lower alkylphenylene, wherein X is a member selected from the group consisting of bivalent aliphatic of one to eight carbon atoms inclusive; cycloaliphatic of four to eight carbon atoms, inclusive; or araliphatic of seven to ten carbon atoms, inclusive;

and R' is a member selected from the group consisting of R, xylylene, alkylene containing 2-20 carbon atoms, and cycloalkylene of four to eight carbon atoms, inclusive.

Of these compounds, the preferred ones are those wherein R' is a phenylene or alkyl substituted phenylene each alkyl of one to three carbon atoms, the number of alkyl substituents being one to three and R is wherein X is a single bond, alkylene of two to eight carbon atoms, inclusive; alkylidene of one to eight carbon atoms, inclusive; cycloalkyl of four to eight carbon atoms, inclusive; cycloalkylidenyl of four to eight carbon atoms, inclusive;

The organic portion of the specific diamino compound, R', which can be employed in the preparation of the aromatic polyetherimides are illustratively exemplified as the diamines at column 3, lines 10-47 of U.S. Pat. No. 3,787,364, which is incorporated herein by reference.

The number of carbon atoms maximum to be used in various alkylene, alkylidene, cycloalkyl, cycloalkylidene, etc. groups are eight carbon atoms, inclusive unless otherwise stated.

The preferred polyetherimide has a heat distortion temperature of 360° F. at 264 pounds per square inch.

Suitable polyamideimides are set forth in U.S. Pat. Nos. 4,331,799 and 4,728,697, both of which are incorporated herein by reference. Polyamideimides can be prepared by reacting diamines with a mixture of a dianhydride and an acyl chloride of a carboxy anhydride or may be prepared by reacting a polyamine with a carboxyanhydride and a dianhydride.

Polyimides have repeating units of the formula:

$$\overset{O}{\underset{\|}{-C}}-\overset{H}{\underset{|}{N}}-\overset{O}{\underset{\|}{C}}-R''- \qquad (VII)$$

wherein R'' is an aliphatic or aromatic divalent hydrocarbon radical. Preferably, R'' includes aromatic groups. Polyimides are well known in the polymer industry. Suitable polyimides are disclosed in Berdahl, U.S. Pat. 4,746,720 and Heath, et. al., U.S. Pat. No. 3,847,867, both patents being incorporated herein by reference.

Polysulfones are obtained from the condensation reaction of a dihydric phenol and a dihalo sulfone, preferably the dihydric phenol is bisphenol A and the dihalosulfone is dichlorophenyl sulfone. Polyphenyl sulfones are derived from the reaction of dihydric phenol and a dihaloaromatic sulfone. Polyether sulfones are also well known in the polymer industry. Suitable polysulfones include polyphenylene sulfones.

Polyetheretherketones and polyetherketoneketones are known thermoplastic materials and can exhibit heat distortion temperatures of about 300° F. under loads of 264 pounds per square inch (PSI). Polyetheretherketones are set forth in U.S. Pat. No. 4,673,450 and 4,629,200, both of which are incorporated herein by reference. Polyetherketoneketones are disclosed in Japanese Patent No. 62/044425.

A particularly useful high heat distortion temperature material is a blend having about 50% by weight of a polyetherimide, about 40% by weight of a polyestercarbonate and about 10% by weight of an organopolysiloxane carbonate as disclosed in Patterson, et. al., U.S. Pat. No. 4,735,999 and Vaughn, U.S. Pat. No. 3,189,662, both patents being incorporated herein by reference.

Aromatic polyamides are derived from an aromatic diamine and an aromatic dicarboxylic acid. A specific aromatic polyamide may be derived from the reaction products of toluenediamine and terephthalic acid and/or isophthalic acid.

The polyphenylene ethers comprise a plurality of structural units having the formula (VIII)

In each of said units independently, each $Q^1$ is independently halogen, primary or secondary lower alkyl (i.e., alkyl containing up to 7 carbon atoms), phenyl, haloalkyl, amino-alkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature. The polyphenylene ether employed is preferably in a form of a blend with polystyrene.

The LHDT material to be suitable as the bonding layer in the process of the present invention preferably has a heat distortion temperature at 264 pounds per square inch of at most about 280° F. and must adhere to the particular HHDT material. While the LHDT materials listed below may not be suitable melt adhesive layers for particular HHDT materials, they may find utility as melt adhesive layers for other HHDT material layers. Suitable low melt temperature materials include polycarbonates, polyestercarbonates, aliphatic polyamides, polyesters including polyethylene terephthalate and polybutylene terephthalate, and polyolefins such as polyethylene, silicon-polyimides and blends of these with other thermoplastic resins, including, for example, aromatic polycarbonate/polybutyleneterephthalate blends.

Polyolefins or olefin-based copolymers employable in the invention include low density polyethylene, high density polyethylene, linear low density polyethylene, isotactic polypropylene, poly(1-butene), poly(4-methyl-1-pentene), propylene-ethylene copolymers and the like. Additional olefin copolymers include copolymers of one or more a-olefins, particularly ethylene, with copolymerizable monomers including, for example, vinyl acetate, acrylic acids and alkylacrylic acids as well as the ester derivatives thereof including, for example, ethylene-acrylic acid, ethyl acrylate, methacrylic acid, methyl methacrylate and the like. Also suitable are the ionomer resins, which may be wholly or partially neutralized with metal ions.

The polyesters in the resinous compositions of this invention usually comprise structural units of the formula:

(IX)

wherein each of $R^1$ and $R^2$ is a divalent aliphatic, alicyclic or aromatic radical containing about 2–10 carbon atoms. At least about 30 of said units are usually present, with at least about 50 being preferred. Such linear polyesters are typically prepared by the known reaction of dihydroxy compounds with dicarboxylic acids or functional derivatives thereof such as anhydrides, acid chlorides or lower alkyl (especially methyl) esters, preferably the esters.

The $R^1$ radicals may be one or more aliphatic, alicyclic or aromatic radicals, alicyclic radicals being known to those skilled in the art to be equivalent to aliphatic radicals for the purposes of the invention. They may be derived from such dihydroxy compounds as ethylene glycol, 1,4-butanediol (both of which are preferred), propylene glycol, 1,3-propanediol, 1,6-hexanediol, 1,1-decanediol, 1,4-cyclohexanedimethanol, 2-butene-1,4-diol, resorcinol, hydroquinone and bisphenol A. They may also be radicals containing substituents which do not substantially alter the reactivity of the dihydroxy compound (e.g., alkoxy, halo, nitrile) or hetero atoms (e.g., oxygen or sulfur).

The $R^2$ radicals may be derived from such acids as succinic, adipic, maleic, isophthalic and terephthalic acids or similar substituted and hetero atom-containing acids. It usually contains about 6–10 carbon atoms.

Most often, $R^1$ and $R^2$ are hydrocarbon radicals. Preferably, $R^1$ is aliphatic and especially saturated aliphatic and $R^2$ is aromatic. The polyester is most desirably a poly(alkylene terephthalate), particularly poly(ethylene terephthalate) or poly(1, 4-butylene terephthalate) (hereinafter sometimes simply "polyethylene terephthalate" and "polybutylene terephthalate", respectively) and especially the latter. Such polyesters are known in the art as illustrated by the following patents:

| | |
|---|---|
| 2,465,319 | 3,047,539 |
| 2,720,502 | 3,671,487 |
| 2,727,881 | 3,953,394 |
| 2,822,348 | 4,128,526. |

The polyesters preferably have number average molecular weights in the range of about 10,000–70,000, as determined by gel permeation chromatography or by intrinsic viscosity (IV) at 30° C. in a mixture of 60% (by weight) phenol and 40% 1,1,2,2-tetrachloroethane.

The aliphatic polyamide may be obtained from the reaction of an aliphatic diamine and an aliphatic dicarboxylic acid and/or a monoaminomonocarboxylic acid. Suitable polyamides have repeating units of the formula selected from the group consisting of:

and wherein R is an aliphatic or cycloaliphatic divalent hydrocarbon radical. Suitable aliphatic polyamides are set forth in Gallucci, et. al., U.S. Pat. No. 4,749,754 and Sybert, U.S. Pat. No. 4,732,937, both patents are incorporated herein by reference.

Silicone-polyimides are set forth in Cella, et. al., U.S. Pat. No. 4,690,997, which is incorporated herein by reference.

The preferred thermoplastic substrate for use herein is a polycarbonate film or sheet. Suitable polycarbonates may be prepared by reacting a dihydric phenol with a carbonate precursor, such as phosgene, haloformate or a carbonate ester. Typically, they will have recurring structural units of the formula:

wherein A is a divalent aromatic radical of the dihydric phenol employed in the polymer producing reaction. Preferably, the aromatic carbonate polymers have an intrinsic viscosity ranging from 0.30 to 1.0 dl./g. (measured in methylene chloride at 25° C.) By dihydric phenols is meant mononuclear or polynuclear aromatic compounds containing two hydroxy radicals, each of which is attached to a carbon atom of an aromatic nucleus. Typical dihydric phenols include 2,2-bis-(4-hydroxyphenyl)-propane; 2,2-bis-(3,5-dimethyl-4-hydroxyphenyl)-propane; 4,4'-dihydroxy-diphenylether, bis(2-hydroxyphenyl)methane, mixtures thereof and the like. The preferred aromatic carbonate polymer for use herein is a homopolymer derived from 2,2-bis(4-hydroxyphenyl)propane, i.e., bisphenol-A.

The laminates of the present invention facilitate the melt bonding of layers of the high temperature material layers and specifically facilitate the twin sheet forming process of the present invention.

Laminates for use in the twin sheets forming process of the present invention have a high heat distortion temperature thermoplastic material layer and a low heat distortion temperature thermoplastic material layer. Suitable laminates include those set forth in Hirt, Jr., et. al., U.S. Pat. No. 4,737,414, which is incorporated herein by reference and which discloses laminates having a polyetherimide layer and a layer selected from the group consisting of polycarbonate resins, polyestercarbonate resins and polyester resins.

The multilayer laminates are prepared in the usual manner, that is by lamination of separate layers extruded in the normal fashion, or by coextrusion through a diehead whereby the layers become intra-die-laminated. Coinjection molding can also be employed. The thickness of each of the layers can vary widely and depends upon the specific application of the multilayer composite. Generally layers of thickness 50 mils or less can be used for the low temperature materials, preferably 3 to 20 mils, most preferably 10 mils. The high temperature material layer can have a thickness of generally 100 mils or less being usable, preferably from 30 to 90 mils, most preferably 60 mils. The laminates most preferably have a total thickness of from 70 mils to 80 mils.

The twin sheet formed hollow articles may be made by creating a layer of a first high heat distortion temperature thermoplastic material, a second high heat distortion thermoplastic material layer and a low heat distortion temperature material layer disposed between the first and second high heat distortion thermoplastic material layers, by either employing a single layered sheet of a high heat distortion temperature material and a laminate having a high heat distortion temperature material layer and a low heat distortion temperature material layer or preferably by employing a pair of such laminates or a pair of single layered sheets of high heat distortion temperature material and a film of low heat distortion temperature material. In any of these cases, the low heat distortion temperature material layer should be located between the high heat distortion temperature material layers during the twin sheet forming process to achieve bonding between the layers of high heat distortion temperature materials. The bonding is preferably achieved at the peripheries of the high heat distortion temperature layers.

DETAILED DESCRIPTION OF THE INVENTION

Figure 1:
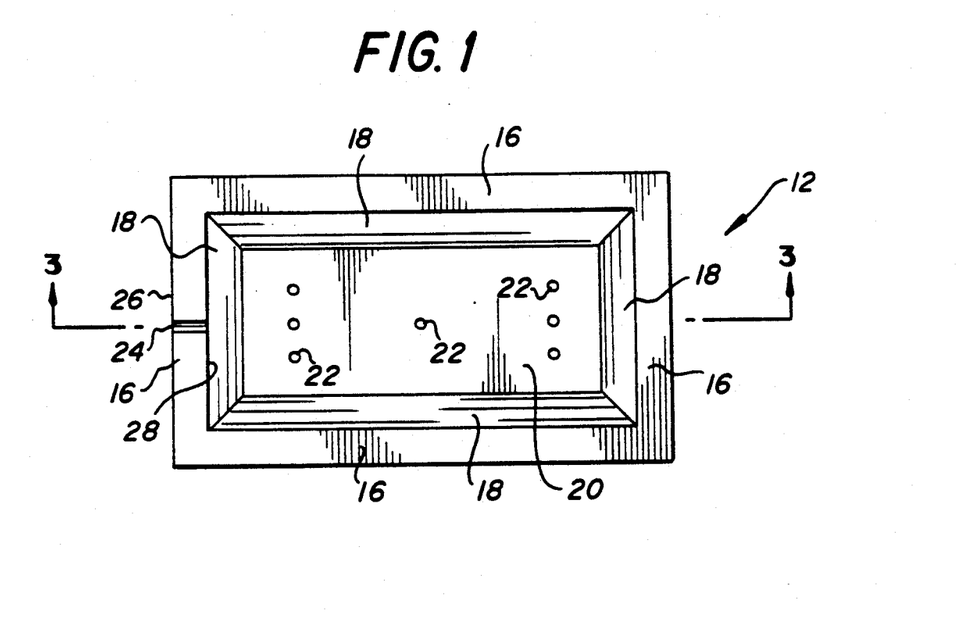
FIG. 1 is a bottom plan view of the inside of the top female mold half.
Figure 2:
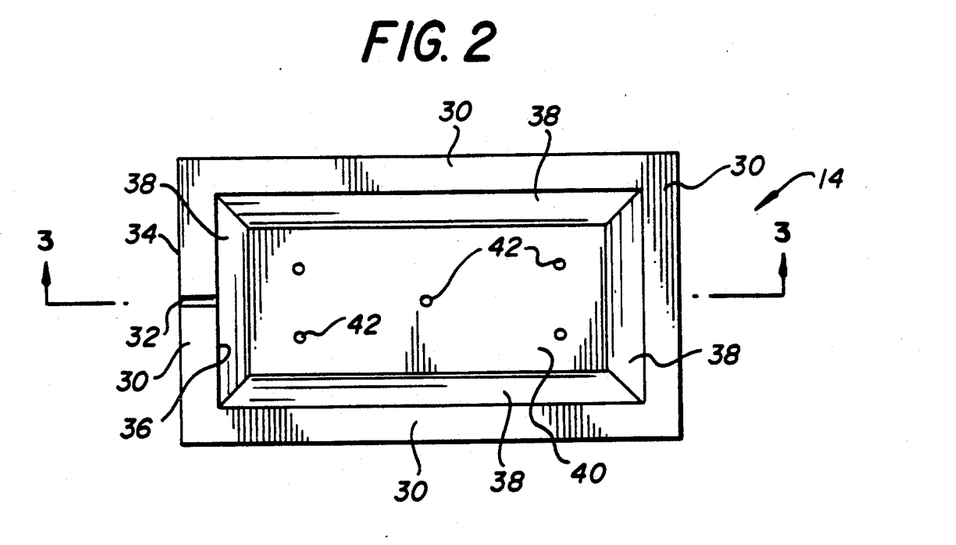
FIG. 2 is a top plan view of the inside of the bottom female mold half.
Figure 3:
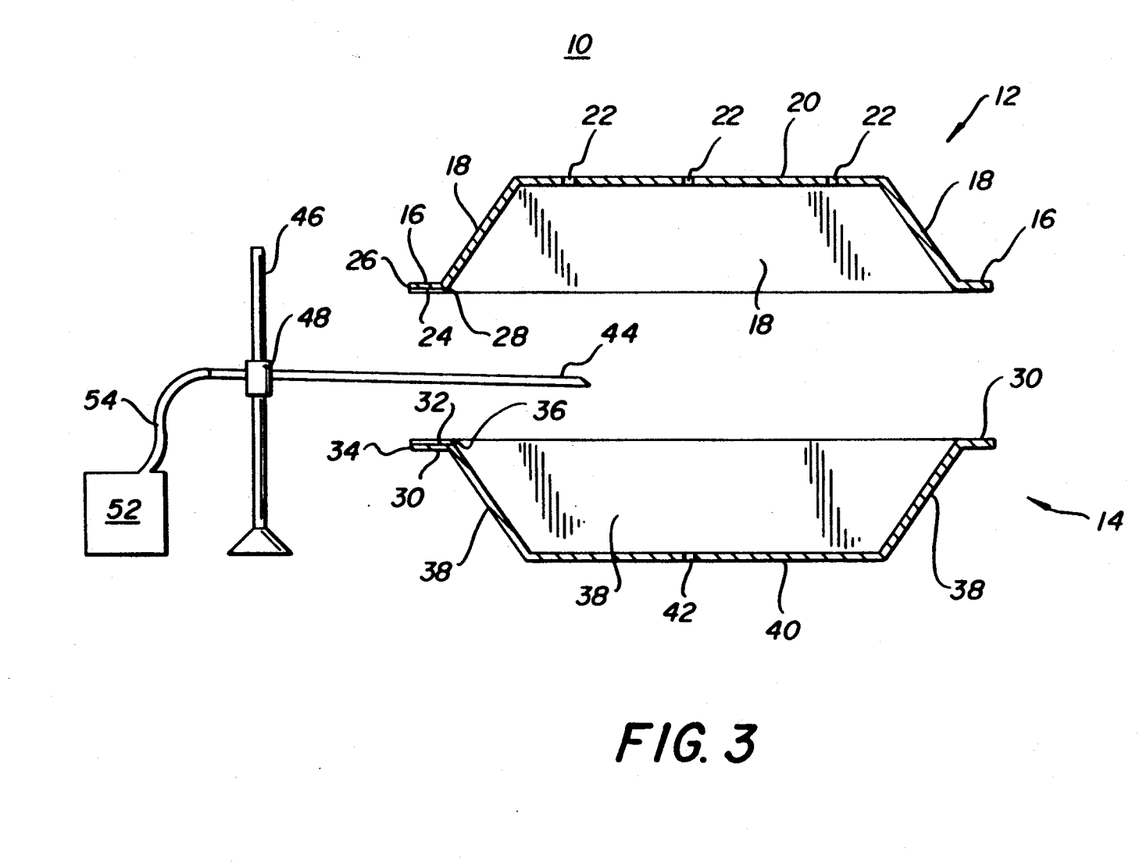
FIG. 3 is a schematic side cross-sectional view of the twin sheet forming equipment in its open position.
Figure 4:
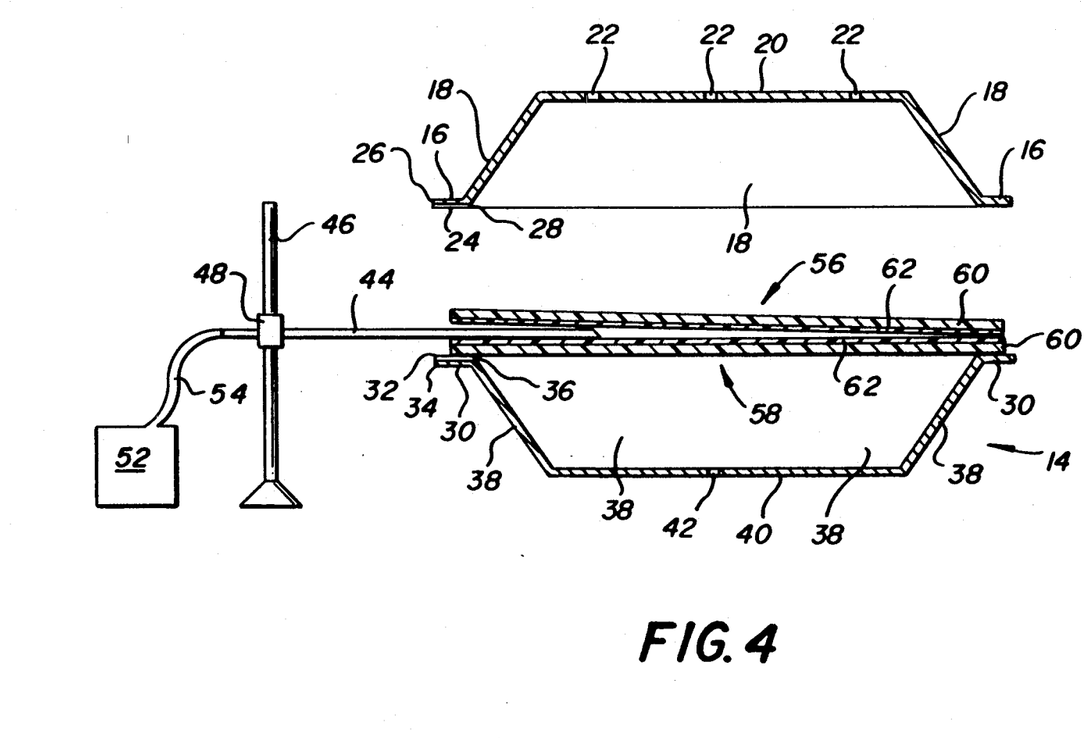
FIG. 4 is a schematic side cross-sectional view of the twin sheet forming equipment in its open position and having two laminates therein with the gas inlet tube disposed between the two laminates.
Figure 5:
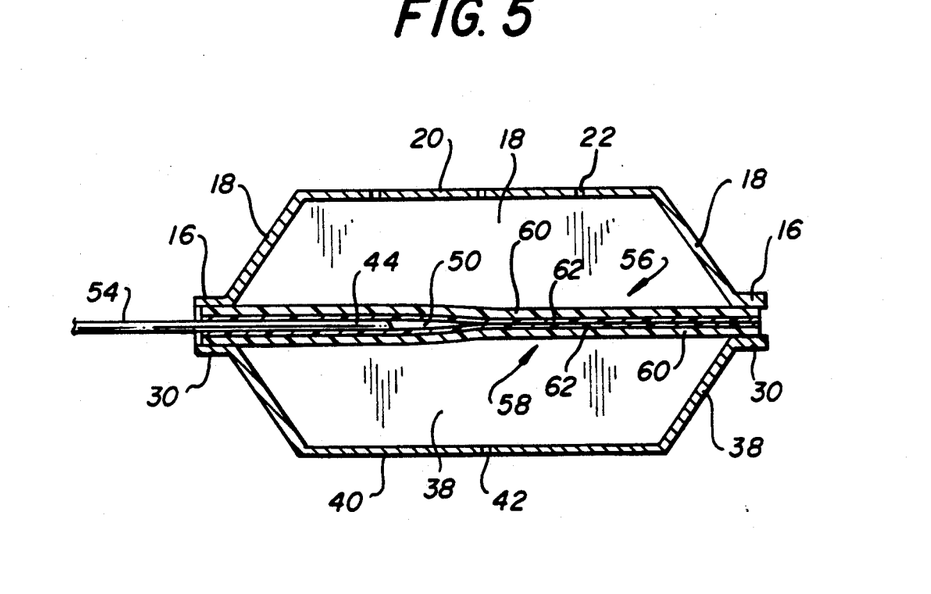
FIG. 5 is a schematic side cross-sectional view of the twin sheet forming equipment in its closed position clamping the peripheries of the laminates.
Figure 6:
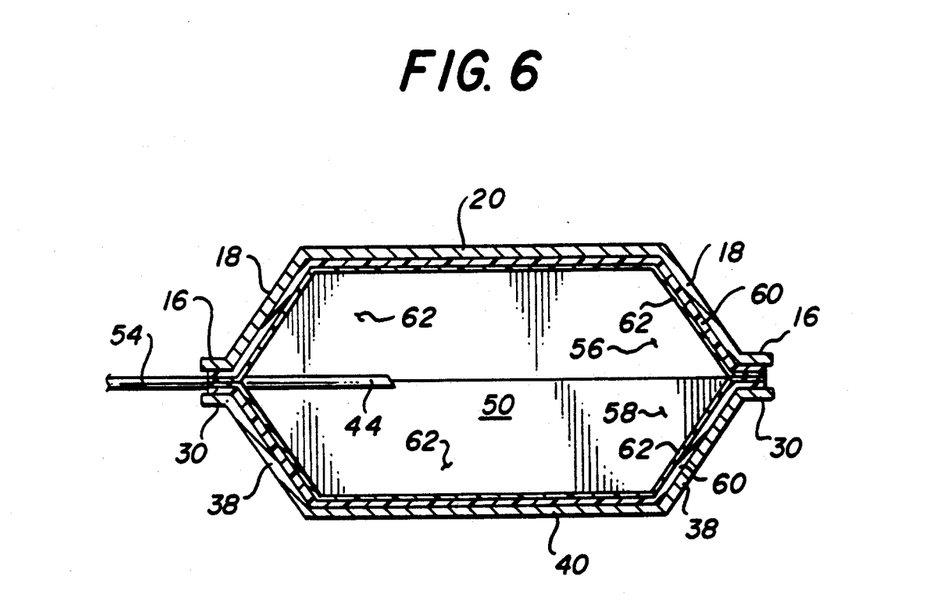
FIG. 6 is a schematic side cross-sectional view of the twin sheet forming equipment and laminates after the cavity of the closed mold has been injected with high pressure gas to cause the laminates to conform to their respective mold halves.
Figure 7:
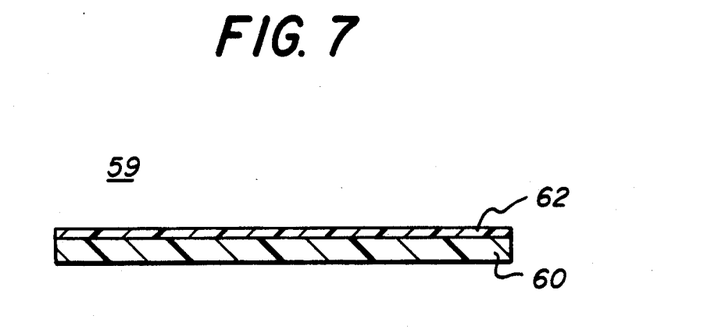
FIG. 7 is a side cross-sectional view of a laminate employed in the process of the present invention.

As illustrated in FIG. 3, the preferred twin sheet thermoforming equipment 10 of the present invention has two mold halves, preferably female mold halves 12, 14 as shown in FIGS. 1 and 2. The mold shapes set forth are exemplary, with other mold shapes also being suitable for the process of the present invention. For example, the mold shapes can be such that the finished parts are circular or oval in cross section. The upper mold half 12 is movable from an open position away from lower mold half 14 as depicted in FIGS. 3 and 4, to a closed position adjacent lower mold half 14 as depicted in FIGS. 5 and 6. Upper mold half 12 has a rectangular horizontal outer rim 16 which frames the outer periphery of the upper mold half. An inner section 18 slopes upwardly and inwardly from the rim 16 to an upper and inner horizontal mold region 20. The mold halves 12, 14 are preferably made of cast aluminum. Region 20 has holes 22 drilled therethrough to allow air to escape from the mold halves 12 during thermoforming. Preferably a vacuum is pulled through holes 22. A half cylindrical channel 24 is located in the rim 16 and extends from the exterior edge 26 of rim 16 to the interior edge 28 of rim 16. The lower mold half 14 is preferably similar in shape to the upper mold half 12. The lower mold half 14 has a horizontal outer rectangular rim 30 which frames the periphery of the lower mold half 14. A half cylinder channel 32 is located on the upper portion of rim 30 and extends from the outer rim edge 34 to the inner rim edge 36 of rim 30 and is parallel with the channel 24 when mold halves 12 and 14 are clamped together. An inner section 38 slopes downwardly and inwardly to a lower horizontal rectangular mold region 40. The mold region 40 has holes 42 drilled therethrough to allow air to escape from the mold half 14 during thermoforming. Preferably a vacuum is pulled through holes 42. Inlet tube 44 for the high pressure gas used during thermoforming, may be supported for (i) vertical movement along and (ii) rotational movement about the longitudinal axis of vertical support rod 46 by attaching the tube 44 to the rod 46 by a hollow collar 48. The inlet tube is preferably made of a metal such as aluminum. During thermoforming the channels 24, 32 clamp around tube 44 which extends into inner cavity 50 formed by mold halves 12 and 14. During thermoforming, high pressure gas, air is suitable, is forced from air source 52 through hose 54 to tube 44 and into cavity 50 between a top sheet 56 and a bottom sheet 58. Preferably both of the sheets 56, 58 are laminates, such as laminate 59 shown in FIG. 7, having a layer 60 of high heat distortion temperature thermoplastic material and a layer 62 of low heat distortion temperature thermoplastic material. In the process of the present invention the sheets are heated to a temperature above the heat distortion temperature of the HHDT material but preferably at a lower temperature than 50° F. below any melting temperature of the HHDT material. If the laminates are used in the process, then the temperature of the laminates during thermoforming may be raised to above the melt temperature of the LHDT material because surface tension will keep the LHDT material on the surface of the HHDT material. The sheets are then placed in the open equipment 10 between the mold halves 12, 14 with the tube 44 inserted between the sheets, the mold is closed clamping the tube between the channels 24, 32 and clamping the sheets 56, 58 together at their peripheries between the rims 16 and 30. The mold halves may be at a temperature above the melt temperature of the LHDT material to further promote melt lamination between the sheets at a temperature below the heat distortion temperature of the HHDT material. Preferably, the mold halves have temperatures below the heat distortion temperature of the HHDT material.

The sheets used may both be laminates as shown in FIGS. 4-7 wherein the laminates have a layer of HHDT material 60 and a layer of LHDT material 62 laminated together in direct adhesive contact with each other.

Figure 8:
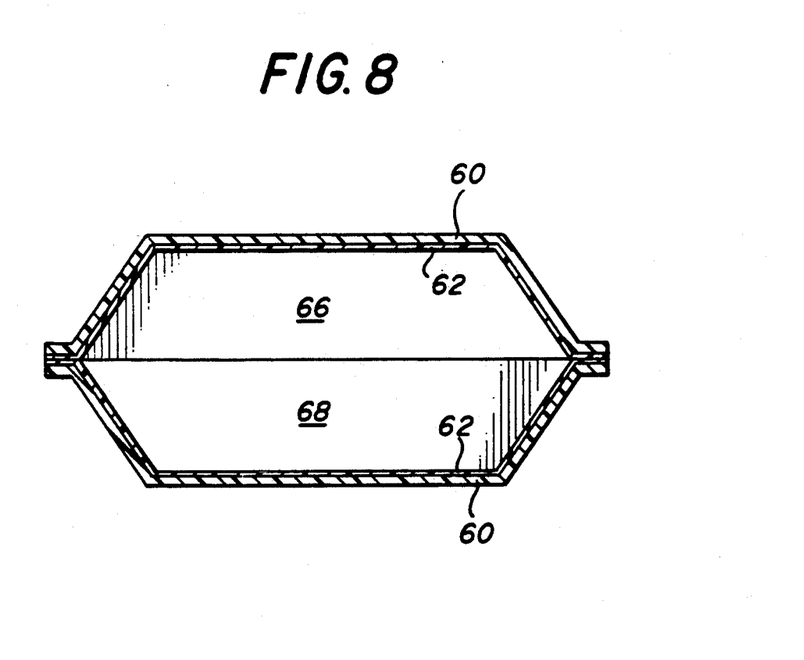
FIG. 8 is a side cross-sectional view of a hollow rigid structure made by the process of the present invention.

As shown in FIG. 8, the structure 64 obtained from the process of the present invention is hollow and rigid and has an upper shell 66 of HHDT material and a lower shell 68 of HHDT material wherein the upper shell and lower shell are adhered together by a LHDT thermoplastic material.

EXAMPLES

The following examples illustrate the present invention but are not meant to limit the scope thereof.

TABLE 1

The following examples illustrate the bond strength obtained employing the process of the present invention for polyetherimide/LHDT layer/polyetherimide[c] structures:

| Example | LHDT Layer Thickness | Mold Temp °F. | Bond Strength (lb/in) |
|---------|---------------------|---------------|----------------------|
| 1 | 10 mil polycarbonate[b] | 330 | 280 |
| 2 | 10 mil PBT[d] | 330 | 430 |
| A[a] | 0 | 330 | 150 |

[a]Example A is a comparison example employing no LHDT bond layer.
[b]The polycarbonate layer was a polycarbonate made by reacting bisphenol A with phosgene and had a heat distortion temperature of 270° F.
[c]the polyetherimide employed was a polyetherimide having an HDT of 360° F.
[d]PBT is polybutylene terephthalate.

What is claimed:

1. A method for twin sheet thermoforming high heat distortion temperature materials, said process employing a first layer of thermoplastic material having a heat distortion temperature of at least 300° F., a second layer of thermoplastic material having a heat distortion temperature of at least 300° F., and a third layer of a thermoplastic material having a heat distortion temperature at most 280° F., said process comprising:
   a) heating said first and second layer to a temperature above 450° F.;
   b) placing said first, second and third layers between two mold halves, with said third layer being disposed between said first and second layers, and said mold halves having a temperature below 300° F.;
   c) pressing said mold halves against portions of said layers to create areas of adhesion between the first, second and third layers,
   d) creating a pressure differential between said first and third layer or said third and second layer sufficient to cause portions of said first layer to spread apart from said third and second layer and conform to their respective mold halves, or to cause portions of said second layer to spread apart from said first and third layer and conform to their respective mold halves, and
   e) cooling said layers to allow said layers to form a rigid, hollow structure.

2. A hollow, twin sheet, thermoformed structure comprising:
   a) a first outer shell layer of thermoplastic material having a heat distortion temperature of at least 300° F.,
   b) a second outer shell layer of thermoplastic material having a heat distortion temperature of at least 300° F., and
   c) a third layer of a thermoplastic material having a heat distortion temperature of at most 280° F., said third layer being disposed between said first and second layers and providing adhesion between said first outer shell layer and said second outer shell layer at the peripheries of said first and second layers and conforming to the shape of said first outer shell layer or said second outer shell layer in the hollow region of the structure.

3. The structure of claim 2 wherein said first and second layers are outer layers.

4. The structure of claim 2 further comprising a fourth layer of a thermoplastic material having a heat distortion temperature below 280° F. disposed between said first and third layers providing adhesion between said first layer and said third layer at the peripheries and said fourth layer conforming to the shape of said first layer and said third layer conforming to the shape of said second layer in the hollow region of the structure.

* * * * *